United States Patent [19]

Glackin

[11] Patent Number: 5,429,086

[45] Date of Patent: Jul. 4, 1995

[54] SHARED RUNNER INTAKE PORTS FOR I.C. ENGINE

[75] Inventor: David R. Glackin, Columbus, Ind.

[73] Assignee: Cummins Engine Company, Inc., Columbus, Ind.

[21] Appl. No.: 196,704

[22] Filed: Feb. 14, 1994

[51] Int. Cl.⁶ ............................................. F02B 31/00
[52] U.S. Cl. .................................. 123/308; 123/188.14
[58] Field of Search ................... 123/308, 432, 188.14

[56] References Cited

U.S. PATENT DOCUMENTS

| | | | |
|---|---|---|---|
| 3,331,359 | 7/1967 | Skatsche | 123/308 |
| 4,627,400 | 12/1986 | Takata et al. | 123/432 |
| 4,744,342 | 5/1988 | Ochiai | 123/308 |
| 4,760,821 | 8/1988 | Aupor et al. | 123/308 |
| 4,809,647 | 3/1989 | Masumoto et al. | |
| 5,007,392 | 4/1991 | Niizato et al. | |
| 5,012,771 | 5/1991 | Oda et al. | |
| 5,085,178 | 2/1992 | Hitomi et al. | |
| 5,094,210 | 3/1992 | Endres et al. | |
| 5,127,371 | 7/1992 | Ogawa et al. | |
| 5,163,406 | 11/1992 | Daly et al. | |
| 5,209,191 | 5/1993 | Kopec. | |

FOREIGN PATENT DOCUMENTS

| | | | |
|---|---|---|---|
| 2322202 | 6/1972 | Germany | 123/308 |
| 0135323 | 8/1983 | Japan | 123/308 |

OTHER PUBLICATIONS

SAE Technical Paper No. 900133 by Nigel F. Gale, *Diesel Engine Cylinder Head Design: The Compromises and Techniques*, pp. 12 and 13. (No Date Given).

*Primary Examiner*—Willis R. Wolfe
*Assistant Examiner*—Erick Solis
*Attorney, Agent, or Firm*—James M. Durlacher

[57] ABSTRACT

A pushrod-operated-valve-in-head six cylinder engine has two intake valves per cylinder. Five of the seven air intake runners in the cylinder head are arranged so that at least one intake valve port of each cylinder adjacent to another cylinder shares an intake runner with an intake valve port of the adjacent cylinder. Each of the shared runners feeds one valve port of each of two adjacent cylinders. The firing order of the engine is such that intake strokes for the adjacent cylinders are separated in time. Therefore, only one of the sharing cylinders at a time is supplied with air by the shared runner. In addition, because each runner is supplying only one valve per cylinder, there are two runners feeding each cylinder. For each cylinder, one port is the tangential type, and the other is the helical type. In one embodiment, the valve port connections to the shared runners are arranged for variable swirl production, by pairing the same style intake ports on each runner e.g. two tangential ports or two helical ports, so air flow can be shut off from the tangential ports at low speed to increase swirl. The tangential ports direct flow into the cylinder tangentially to the cylinder wall and are located 270 degrees around the cylinder in an upstream direction from the helical ports to minimize interference of the tangential flow with the swirl produced by the helical ports.

25 Claims, 6 Drawing Sheets

SHARED RUNNER INTAKE PORTS FOR I.C. ENGINE

BACKGROUND OF THE INVENTION

1. Field of the Invention

This invention relates generally to internal combustion reciprocating engines, and more particularly to the delivery of the combustion air to the cylinders.

2. Description of the Prior Art

There are continuous efforts in the engine industry to improve performance while reducing size, weight and cost of engines. One technique with diesel engines has been to use two intake valves and two exhaust valves for each cylinder. In some cases, air is supplied to the cylinders through only one intake valve port for low load operation, and through both intake valve ports for high load operating conditions. For example, U.S. Pat. No. 5,094,210 to Endres et al., discloses an intake and fuel/air mixing system for multi-cylinder, externally ignited internal combustion engines with at least two valves per cylinder and at least two separate intake pipe arms per cylinder. One of the two intake pipe arms for each cylinder is supplied from one air inlet common to the first group of intake pipe arms. The other of the two pipe arms for each cylinder is supplied from another air inlet common to the second group. The patent discloses a method for controlling the air flow rate to the cylinders by means of throttling members such that the first group opens first by means of throttling member I-7 for engine operating regions of low flow rates, with the other group being opened by operating throttling member II-10 as a function of the speed and load for higher flow rates.

For valve-in-head engines, cross-flow cylinder heads (where the intake ports are located on one side of the cylinder head and the exhaust ports on the other) are the optimum arrangement from a gas transport standpoint. An example of a cross-flow head is shown in U.S. Pat. No. 5,007,392 to Niizato et al. (FIG. 2). But cross-flow heads are difficult to design for a pushrod engine, because pushrods and intake ports have conflicting space requirements.

The results of some design studies for cross-flow heads for pushrod engines are described in a publication by The Society of Automotive Engineers (SAE) in a technical paper No. 900133 written by Nigel F. Gale of the Southwest Research Institute entitled *Diesel Engine Cylinder-Head Design: The Compromises and Techniques*. FIGS. 22 and 23 in that paper show cross-flow four-valve cylinder head layouts. The FIG. 23 version shows a layout using an intake runner which is shared by the helical intake port of one cylinder and a tangential "directed" intake port of an adjacent cylinder where the ports are arranged in a "diamond" configuration. This is described on page 12 of the paper. I think the configuration shown and described in that publication would result in undesirable flow characteristics. Therefore, an object of the present invention is to provide an improved cross-flow, four-valve cylinder head useful with pushrod operated or overhead cam engines and laving improved intake gas flow characteristics.

SUMMARY OF THE INVENTION

Described briefly, according to a typical embodiment of the present invention, the cylinder head for a pushrod-type valve-in-head engine is provided with air intake runners which, for certain runners and inside the head, supply intake valve ports for more than one cylinder. The two adjacent cylinders sharing a runner have intake strokes separated in time sufficient that ample intake air can be delivered to the intake valve port of each of the cylinders, when appropriate, and the single runner is of sufficient size to do so but without interference between it and the necessary pushrod clearance passage through the head.

Several arrangements of shared runners are employed. In each instance, the tangential port is located about 270° around the cylinder in an upstream direction from the helical port, whereby the flow from the tangential port can proceed around the cylinder wall about 270° before encountering the swirl from the helical port.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
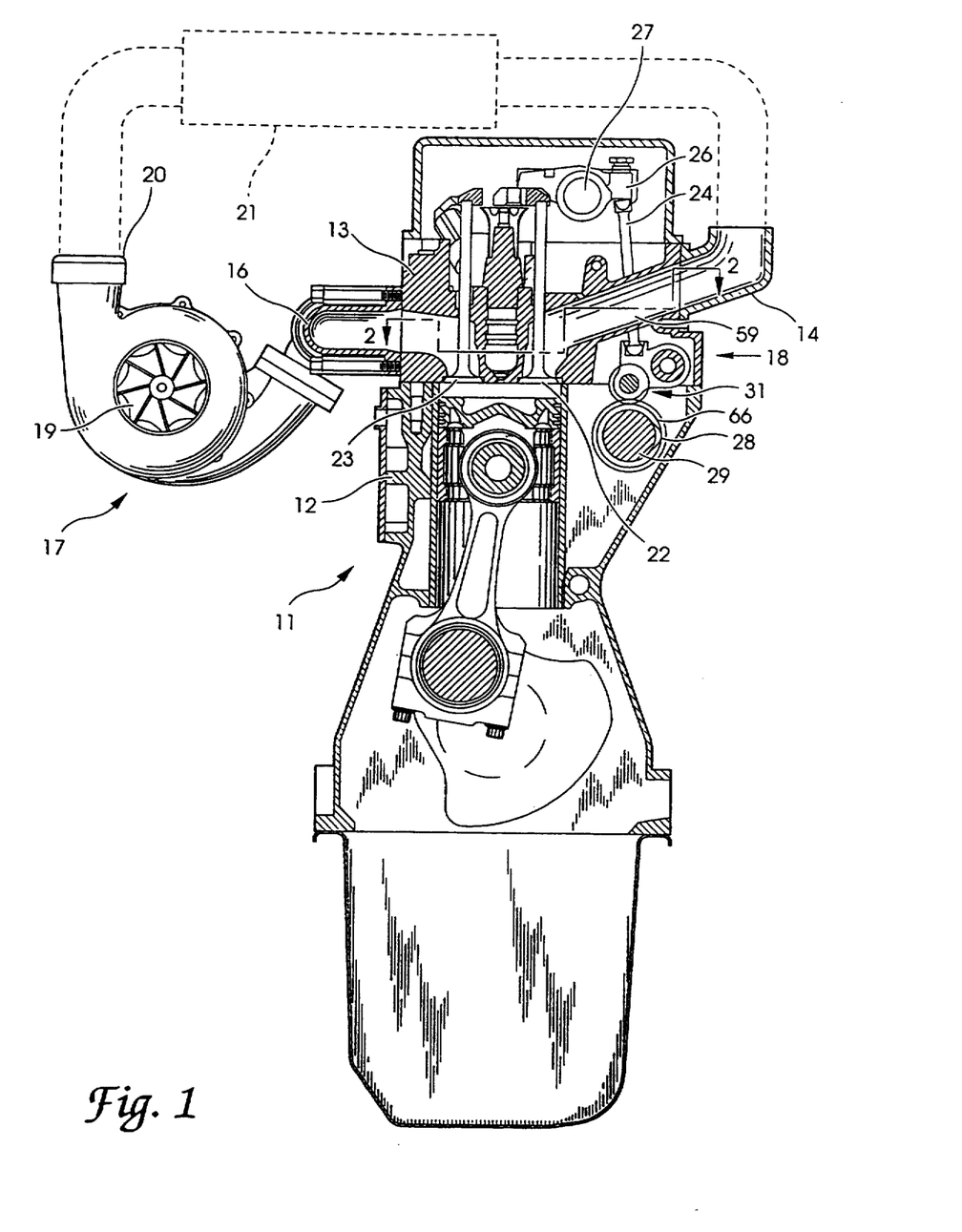
FIG. 1 is a vertical section through an internal combustion reciprocating engine having pushrod operated valves in the cylinder head.

Referring now to the drawings in detail, and particularly FIG. 1, the internal combustion engine 11 has the cylinder block 12, cylinder head 13, intake manifold 14 and exhaust manifold 16, both of which are connected directly or indirectly to the turbocharger 17. Accordingly, gas flow through the cylinder head is in the direction of the arrow 18 from the intake manifold 14 through the cylinder head 13 and out the exhaust manifold to the turbocharger exhaust inlet. Fresh filtered air enters the turbocharger at 19 and is discharged from the turbocharger at 20 and piped through intercooler 21 to the intake manifold 14.

In this engine, control of the intake and exhaust porting functions is by intake valves 22 and exhaust valves 23. The intake valves are operated by pushrods 24 operating through rocker arms 26 on a rocker shaft 27. The pushrods are driven by cams 28 on cam shaft 29. Roller-type lifters 31 may be interposed between the cams and the pushrods, if desired. The exhaust valves are operated in the same way, although by different pushrods driven by different cams on the same cam shaft and operating different rocker arms mounted on the same rocker shaft. Other arrangements can be made and which would be served as well by the present invention.

Figure 2:
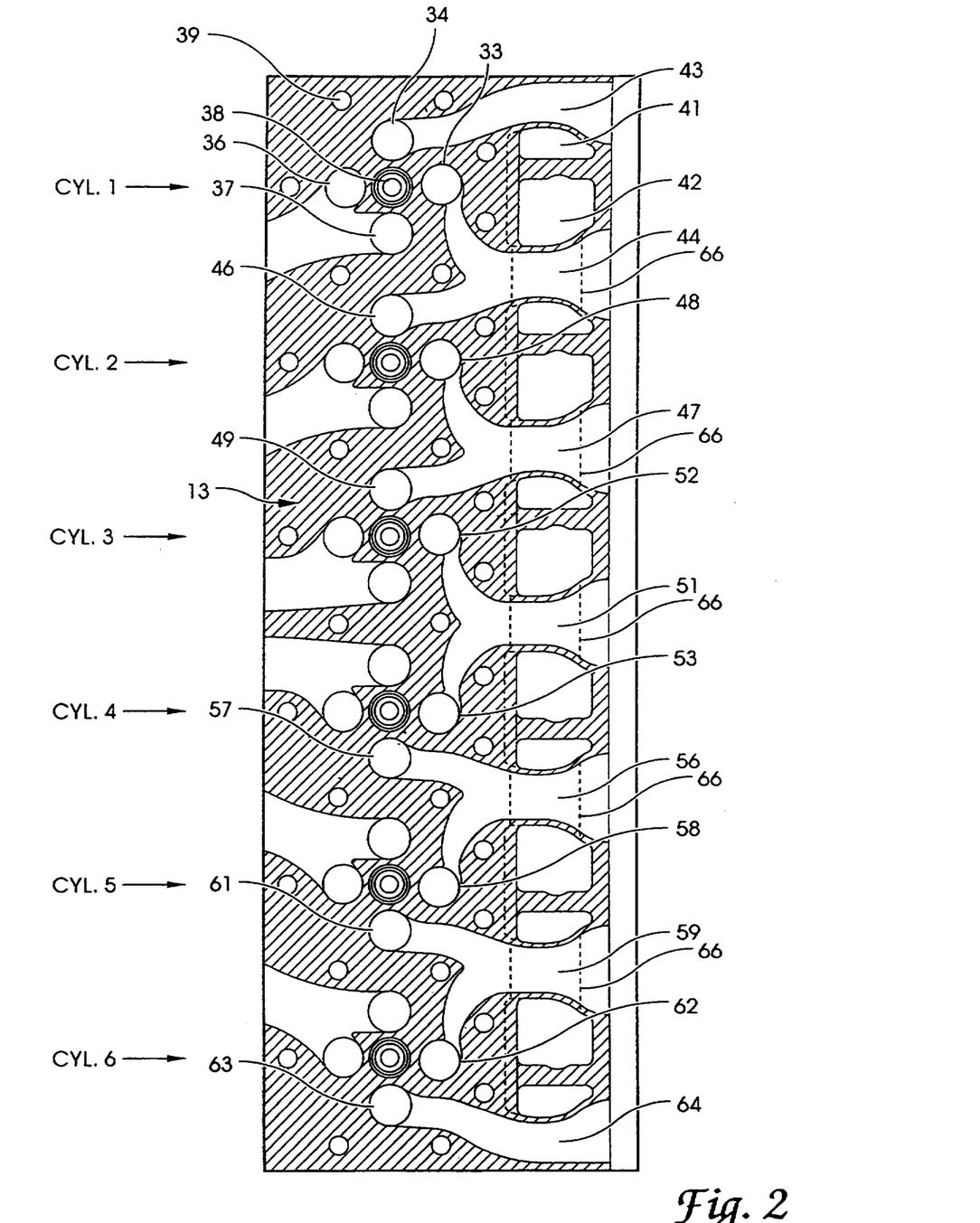
FIG. 2 is a cross section through the cylinder head taken at line 2—2 in FIG. 1 and viewed in the direction of the arrows but omitting the valves and showing the valve ports schematically.

Referring now to FIG. 2, there is shown a cylinder head arrangement for a six cylinder engine in which the cylinders are numbered one through six, beginning at the front of engine which is at the top of the drawing. For cylinder No. 1, the cylinder head provides one intake valve port 33 of the "helical" type for helical flow of the intake air into the cylinder, and a "tangential" intake port 34. Two exhaust valve ports 36 and 37 are also provided for the No. 1 cylinder, and the fuel injector port 38 is centered between these four ports and directly over the center of the cylinder. Seven cylinder head bolt holes 39 are provided in an array around the valve ports. The same general pattern of bolt holes is repeated for each of the cylinder locations, with two of the holes being shared between the adjacent cylinders. Miscellaneous additional holes are provided for bolts and for coolant but, to simplify drawing, are not shown in FIG. 2.

Comparatively large holes 41 and 42 are provided for cylinder No. 1 and the same arrangement is provided for the No. 2 and No. 3 cylinders, with mirror images thereof being provided for the Nos. 4, 5 and 6 cylinders. These holes are necessary for the pushrods for operating the four valves per cylinder. They occupy significant space in the cylinder head and severly limit the available space for intake runners to the valve ports. Therefore, but for the present invention, they would significantly limit the amount of air that can be delivered to the intake ports.

Figure 5:
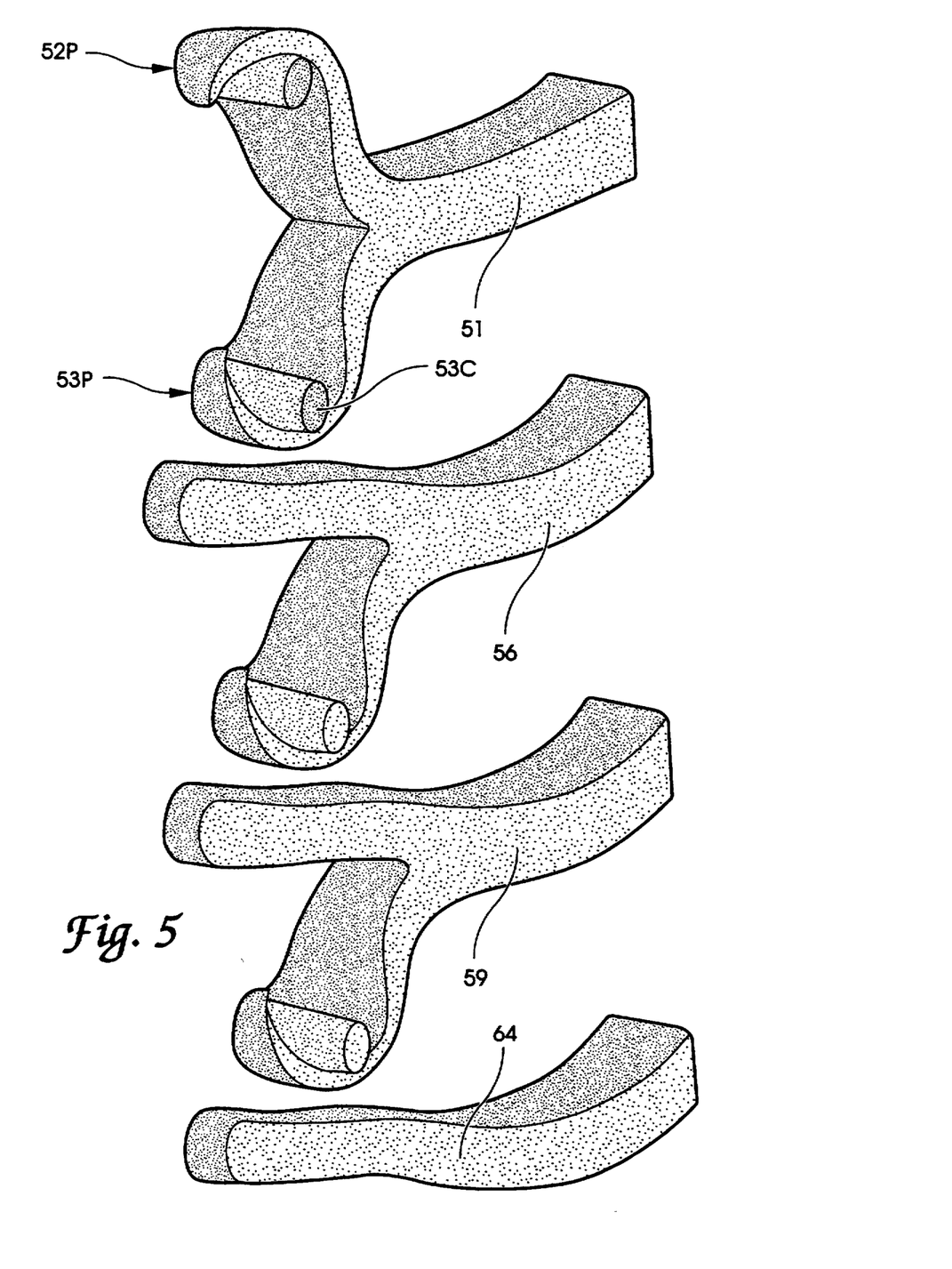
FIG. 5 is an illustration of core forms for passageways to seven intake ports in the arrangement shown in FIG. 2 for cylinders 4, 5 and 6 thereof and for the helical port for cylinder 3.

Referring further to FIG. 2, for cylinder No. 1, intake runner 43 serves the tangential port 34. Intake runner 44 serves the helical port 33. It also serves the tangential port 46 of cylinder No. 2 according to the present invention. Intake runner 47 serves the helical port 48 of cylinder No. 2 and the tangential port 49 of cylinder No. 3. Intake port 51 serves the helical port 52 of cylinder No. 3 and the helical port 53 of cylinder No. 4. Intake runner 56 serves the tangential port 57 of cylinder No. 4 and the helical port 58 of cylinder No. 5. Intake runner 59 serves the tangential port 61 of cylinder No. 5 and the helical port 62 of cylinder No. 6. The tangential port 63 of cylinder No. 6 is served by runner 64. The shared runners are situated above the five camshaft bearing journals 66. FIG. 5 is a somewhat pictorial illustration of the cores used for the runners during the casting process for runners 51, 56, 59 and 64. These forms define the shape of the passageways from a location above the camshaft bearing journals to the respective intake ports. The cylindrical boss-like portions such as 53C are at the center of the helices of the helical ports. The stems of the intake valves for these ports extend through the center of the cavities formed by these core portions.

The firing order of this engine is 1-5-3-6-2-4. Therefore, the intake strokes for any two cylinders located adjacent each other in the cylinder block are separated sufficiently that no intake runner is required to supply two cylinders at the same time. In this way, maximum advantage of minimal available space for intake runners in the cylinder head is achieved.

Figure 3:
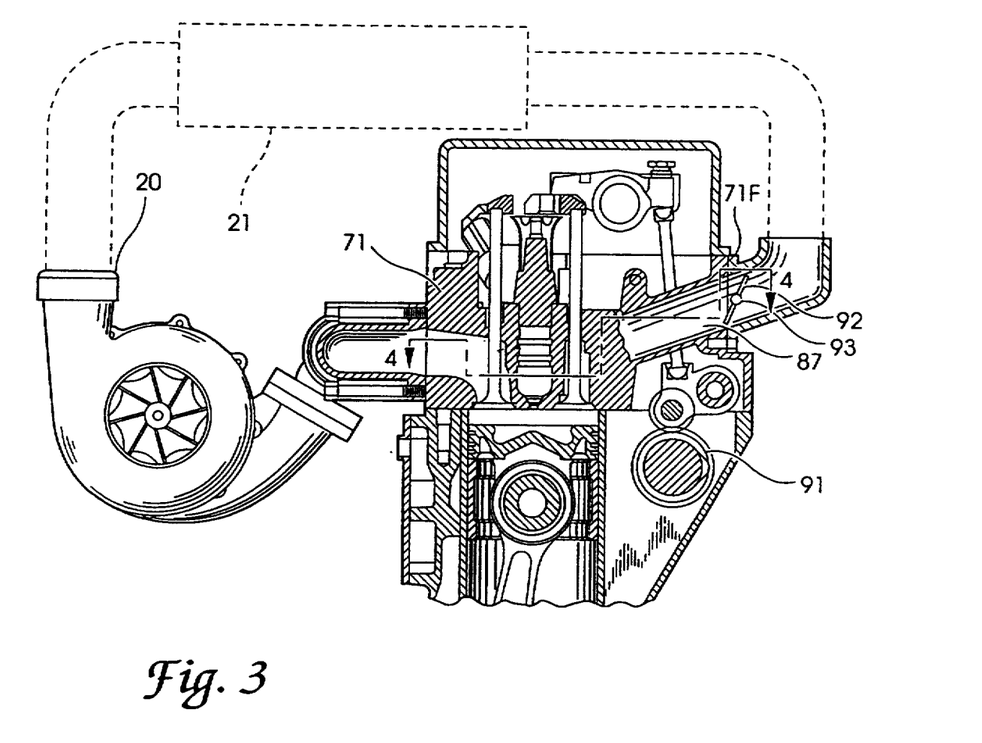
FIG. 3 is a fragmentary section similar to that of FIG. 1 but showing means for separately controlling air flow to the two different types of valve ports.
Figure 4:
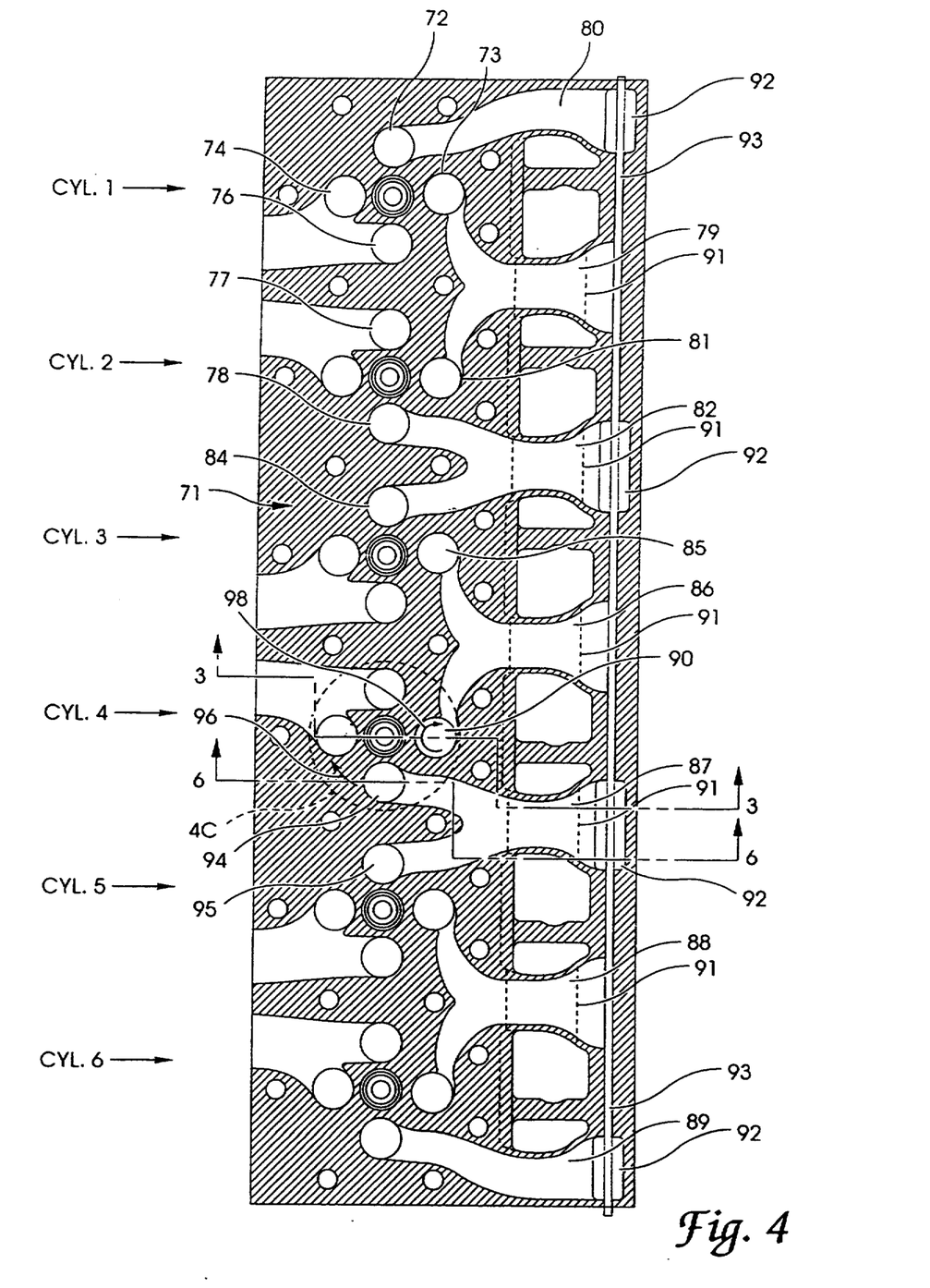
FIG. 4 is a section like that of FIG. 2 but taken at line 4—4 in FIG. 3 and viewed in the direction of the arrows, for a different embodiment of the invention in which each intake runner for a given pair of cylinders serves the same style valve port for the two cylinders.

Referring now to FIGS. 3 and 4, a cylinder head having the same general arrangement of valve ports and pushrod openings and intake runners is shown, but specifics are different. The cylinder head 71 has intake valve ports 72 and 73 and exhaust valve ports 74 and 76. These and the injector port are arranged in the same manner as in the previously described embodiment of FIG. 2. However, for cylinder No. 2, and in contrast to FIG. 2, port 77 is an exhaust port, and port 78 is an intake port. Also, the runner 79 supplies the helical port 73 as did intake runner 44 of FIG. 2 supply the helical port 33. But runner 79 in FIG. 4 supplies the helical port 81 of cylinder No. 2, not the tangential port for cylinder No. 2.

Another difference in the arrangement of the FIG. 4 cylinder head is that the intake runner 82 supplies the tangential (not helical) port 78 of cylinder No. 2 and the tangential port 84 of cylinder No. 3.

Intake runner 86 serves the helical ports 85 and 90 for cylinders Nos. 3 and 4, respectively, as does the intake runner 51 of the FIG. 2 embodiment. But intake runner 87 of FIG. 4 serves the tangential ports 94 and 95 of cylinders Nos. 4 and 5, respectively, not the helical port of cylinder No. 5, in contrast to FIG. 2. Also, intake runner 88 serves the helical ports of cylinders Nos. 5 and 6, in contrast to service of the tangential port of cylinder No. 5. Runner 89 serves the tangential port of cylinder No. 6 as was the case in FIG. 2. In this embodiment, as in the other one, runners are above the camshaft bearings 91.

It is to be noted that in the FIG. 4 embodiment, each shared runner serves the same type of port for the two cylinders which share the runner. This is not true in the FIG. 2 embodiment where only one-of the runners, namely runner 51, serves the same type of port in two adjacent cylinders. The arrangement adapts the FIGS. 3 and 4 embodiment readily for variable swirl productions. By paring the same style intake ports on each runner, e.g. two tangential ports or two helical ports, air flow can be shut off from the tangential ports at low speed to increase swirl. At high speeds, both ports would flow, producing a lower swirl. The shutoff of air from the tangential ports in the embodiment of FIG. 4 is achieved by the control valve blades 92. These blades are mounted on shaft 93 which extends through the manifold 14 and immediately outside the manifold mounting face 71F of the cylinder head 71. Turning the shaft controls the air flow to the runners 80, 82, 87, and 89.

The shared runner intake concept of the present invention makes more efficient use of the space available so that the intake flow is not compromised during passage between pushrod openings. This has been accomplished by utilizing the wider spaces between the pushrods, that are located between each pair of cylinders where there is a camshaft bearing journal. There are five such spaces on the six cylinder engine illustrated and which, combined with the small areas at the front and rear of the engine, allow creation of seven small intake runners feeding six cylinders. While any one of these runners is too small to supply an adequate amount of air to a cylinder under high load and speed conditions, the center five runners being shared by two cylinders according to the present invention, with each runner feeding one valve on two adjacent cylinders at different times, provides room for ample air supply.

Figure 6:
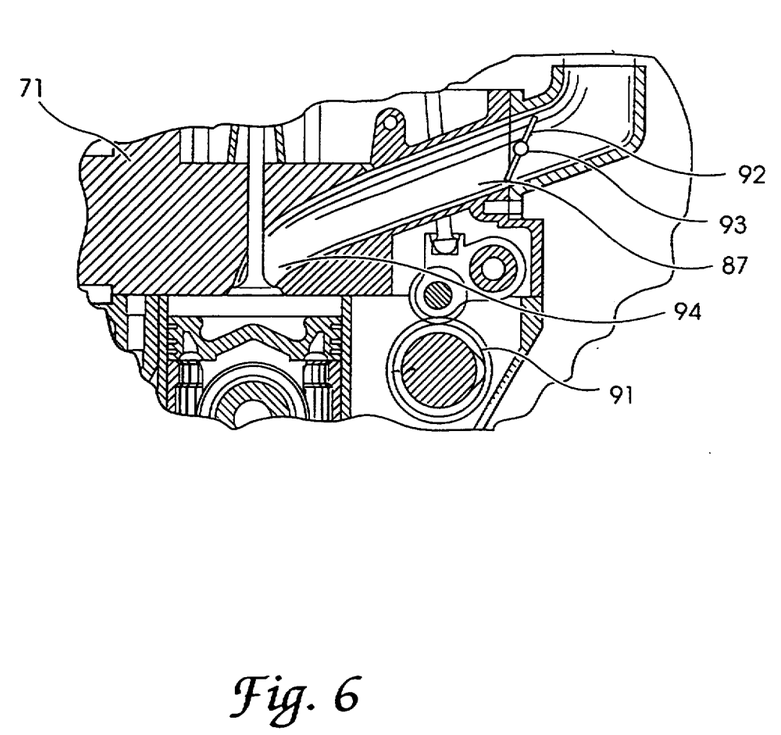
FIG. 6 is a fragmentary sectional view similar to that of FIG. 3 but cut through at the tangential port and shared runner at line 6—6 in FIG. 4 and viewed in the direction of the arrows.

It may be noted here that, while the shared runner feature is particularly useful in pushrod engines, to accommodate pushrod space needs, it can provide improved flow characteristics in overhead cam engines. With further reference to improved flow characteristics, and referring specifically to FIGS. 4 and 6, the tangential port 94 is supplied by the runner 87 which is oriented such as shown in FIG. 6 at the port 94 and directs the air along the cylinder wall and in a clockwise direction as indicated by arrow 96 in FIG. 4 around the cylinder wall 4C (thus the "tangential" nomenclature). At the same time, the air entering helical port 90 from runner 86 is moving downward in a helical direction through the pork around the valve stem also in the clockwise direction of the arrow 98 (FIG. 4). Port 90 is 270° aroused the cylinder from the direct or tangential port 94. Consequently, it is 270° clockwise downstream from the incoming air from the tangential port 94. With the valves for these two ports opening essentially simultaneously, clockwise swirl introduced through helical port 90, is not as susceptible to destruction by the clockwise tangential flow from tangential port 94 located 270° degrees upstream of port 90 according to the present invention. Therefore, the benefits of the swirl from the helical port as well as additional air input from the tangential port 94 are achieved at the high flow rates by this arrangement.

Consideration of the relationship of the tangential ports and helical ports and the orientation of the helix for each of the helical ports in the embodiment of FIG. 4 shows that the helical port swirl and tangential port flow around the cylinder wall is counterclockwise for cylinders 1, 3 and 5, and is clockwise for cylinders 2, 4 and 6.

In the FIG. 2 embodiment, as was previously noted, the sharing of runners is different in some respects, but the supportive relationship of the tangential port with the helical port for each of the cylinders is used. In this case, however, the swirl from the helical port and the flow from the tangential port is in a counterclockwise direction for cylinders 1, 2, and 3, and it is in the clockwise direction for cylinders 4, 5 and 6.

Perhaps it should be mentioned at this point that for the counterclockwise helical pork, the configuration of the helical passageway into the port is as shown at 52P in FIG. 5. This is true for all of the counterclockwise helical ports in both the FIGS. 2 and 4 embodiments. Similarly, for the clockwise swirl, the configuration of the passageway from the runner to the port adjacent the port is as shown at 53P in FIG. 5 and is used for the clockwise swirl porks in both the FIG. 2 and FIG. 4 embodiments of the cylinder head.

While the invention has been illustrated and described in detail in the drawings and foregoing description, the same is to be considered as illustrative and not restrictive in character, it being understood that only the preferred embodiment has been shown and described and that, all changes and modifications that come within the spirit of the invention are desired to be protected.

What is claimed is:

1. In an internal combustion engine cylinder head having exhaust valve ports and intake valve porks for a plurality of cylinders, the intake and exhaust ports for each cylinder being circularly-spaced ill an array around a center for that cylinder, there being two intake ports per cylinder, one port of the two for certain cylinders being a helical port and the other port of the two for the certain cylinders being a tangential port, the improvement comprising:

an air inlet; and
an air conveying passageway in the head beginning at the inlet and having two branches, one of the branches ending at one of the two intake ports for a first cylinder, the other branch ending at the first of the two intake ports for a second cylinder;
the helical intake port for the first cylinder being located more than 135 degrees around the center in a downstream direction from the tangential intake port for the first cylinder.

2. The improvement of claim 1 and wherein:
the one intake port for the first cylinder is the helical port.

3. The improvement of claim 1 and further comprising:
a second air inlet; and
a second air conveying passageway in the head beginning at the second inlet and having two branches, one of the branches ending at a second intake port for the second cylinder and the other of the branches ending at a first intake port for a third cylinder.

4. The improvement of claim 3 and wherein:
the first of the two intake ports for the second cylinder is a tangential port and the first of the two intake ports for the third cylinder is a tangential port.

5. The improvement of claim 3 and wherein:
the first of the two intake ports for the second cylinder is a helical port and the first of the two intake ports of the third cylinder is a tangential port.

6. The improvement of claim 3 and further comprising:
a third inlet;
a third air conveying passageway in the head beginning at the third inlet and having two branches, one of the branches ending at the helical port for the third cylinder, and the other of the branches ending at a helical port for a fourth cylinder.

7. The improvement of claim 3 and wherein the head includes, for additional cylinders, arrays of valve ports like the first mentioned array and, together with those for the first and second cylinders, there are arrays for a total of N cylinders in the plurality, the improvement further comprising:
N-3 additional passageways and N-3 additional inlets, each different one of the additional passageways beginning at a different one of the additional inlets,
each of the additional passageways having two branches,
one branch of each additional passageway ending in one intake port of one array, and the other branch of each additional passageway ending in one intake port of an array next to the one array.

8. The improvement of claim 7 and wherein:
the helical intake port for each array is located about 270 degrees around the center for that array in a downstream direction from the tangential intake port for that array.

9. The improvement of claim 8 and wherein:
the tangential and helical ports are arranged in the arrays such that the direction of flow downstream from the tangential port toward the helical port in the array is in a counter-clockwise direction for the first N/2 cylinders, and in the clockwise direction for the next N/2 cylinders.

10. The improvement of claim 8 and wherein:
the tangential and helical ports are arranged in the arrays such that the direction of flow downstream from the tangential port toward the helical port in the array is in a direction which alternates from counter-clockwise to clockwise to counter-clockwise in adjacent arrays in series from one end of the head to the other.

11. The improvement of claim 10 and further comprising:
flow control valves controlling flow in the passageways having branches ending in tangential ports.

12. The improvement of claim 11 and wherein the head has a valve operating pushrod opening through the head between the first-mentioned and the second passageway.

13. The improvement of claim 3 and wherein:
the centers for the cylinders are located in a line; and
the tangential and helical ports for the cylinder at one end of the line are arranged in the array for the direction of flow downstream from the tangential port toward the helical port in the array to be in a direction opposite the direction of flow for the tangential and helical ports for the cylinder at the other end of the line.

14. The improvement of claim 13 and wherein:
the arrangement of ports for the cylinder at one end is for a clockwise direction of flow, and the arrangement of ports for the cylinder at the other end of the line is for a counterclockwise direction of flow.

15. In an internal combustion engine having a cylinder block with a plurality of combustion cylinders in a line therein, and having a cylinder head on the cylinder block closing the head ends of the cylinders, and two air intake valve ports in the cylinder head for each cylinder, one of the two valve ports for each cylinder being helical and the other being tangential, and pistons in the cylinders and valves in the ports operated in synchronism such that intake valves in adjacent cylinders in the line are not opened at the same time, the improvement comprising:
an air inlet;
an air conveying passageway in the head beginning at the inlet and extending toward at least two of the valve ports and having two branches, one of the branches ending at one of the two valve ports for a first one of the cylinders, the other branch ending at the other of the two ports for a second one of the cylinders;
a second air inlet; and
a second air conveying passageway in the head beginning at the second inlet and extending toward at least a second two of the valve ports and having two branches, one of the branches ending at one of the second two ports for the second cylinder, and the other of the branches ending at the other of the second two ports for a third one of the cylinders, the helical valve port for each cylinder being located about 270° around the cylinder axis downstream from the tangential port.

16. The improvement of claim 15 and wherein the head has a valve operating pushrod opening through the head between the first-mentioned and the second passageway.

17. The improvement of claim 16 and further comprising: a camshaft bearing under the first-mentioned and second passageway.

18. The improvement of claim 15 and wherein the head includes said intake valve ports for a total of N cylinders in the plurality, the improvement further comprising:
N-3 additional passageways,
each of the additional passageways having two branches,
one branch of each additional passageway ending in one of the two intake ports for one of the cylinders, and the other branch of each additional passageway ending in one of the two intake ports for a different one of the cylinders.

19. The improvement of claim 18 and wherein:
N=6; and
the firing order for the engine is 1-5-3-6-2-4.

20. The improvement of claim 18 wherein:
each of the additional passageways extends between two pushrod-receiving openings through the head.

21. The improvement of claim 15 and wherein:
one of the branches of the first-mentioned passageway ends at a helical port for the first cylinder, and the other branch of the first-mentioned passageway ends at a helical port for the second cylinder;
one of the branches of the second passageway ends at a tangential port for the second cylinder, and the other branch of the second passageway ends at a tangential port for the third cylinder; and
a third air inlet is provided in the cylinder head; and
a third air conveying passageway is provided in the head beginning at the third inlet and extending toward a third two of the ports and having two branches, one of the branches ending at a helical port for the third cylinder, and the other of the branches ending at a helical port for a fourth cylinder.

22. The improvement of claim 21 and further comprising:
an intake manifold coupled to the inlets; arid
a controller in the path of air from the intake manifold to the second passageway and operable, widen actuated, to limit flow of air into the second passageway.

23. The improvement of claim 15 and wherein:
the arrangement of the tangential and helical intake valve ports for the cylinder at one end of the line is a mirror image of the arrangement of the tangential and helical intake valve ports for the cylinder at the other end of the line.

24. The improvement of claim 23 and wherein:
the arrangement of the tangential and helical intake valve ports for the second cylinder from the one end is a mirror image of the arrangement of the tangential and helical intake valve ports for the second cylinder from the other end of the line.

25. The improvement of claim 24 and wherein:
the engine has N cylinders in the plurality;
the head has a valve operating pushrod opening through the head between the first mentioned passageway and the second passageway; and
the head has air conveying passageways for the N-1 and N-2 cylinders, and a valve operating pushrod opening between the air conveying passageways for the N-1 and N-2 cylinders;
the arrangement of the air conveying passageways for the N-1 and N-2 cylinders being a mirror image of the arrangement of the first-mentioned and second passageways.

* * * * *

UNITED STATES PATENT AND TRADEMARK OFFICE
CERTIFICATE OF CORRECTION

PATENT NO. : 5,429,086
DATED : July 4, 1995
INVENTOR(S) : David R. Glackin It is certified that error appears in the above-identified patent and that said Letters Patent is hereby corrected as shown below:

Column 1, line 62, change "laving" to "having".
Column 3, line 16, insert "the" after the words "the front of".
Column 4, line 38, delete the hyphen between the words "one of".
Column 4, line 42, delete the "s" from "tion."
Column 5, line 16, change "pork" to "port".
Column 5, line 18, change "aroused" to "around".
Column 5, line 27, insert "the" after the words "as well as".
Column 5, line 46, change "pork" to "port".
Column 5, line 53, change "porks" to "ports".
Column 5, line 65, change "porks" to "ports".
Column 5, line 67, change "ill" to "in".
Column 6, line 46, add a hyphen between the words "first mentioned".
Column 8, line 39, change "arid" to "and".
Column 8, line 41, change ". widen." to ", when".

Signed and Sealed this

Tenth Day of October, 1995

Attest:

BRUCE LEHMAN

Attesting Officer

Commissioner of Patents and Trademarks